Figure 1:
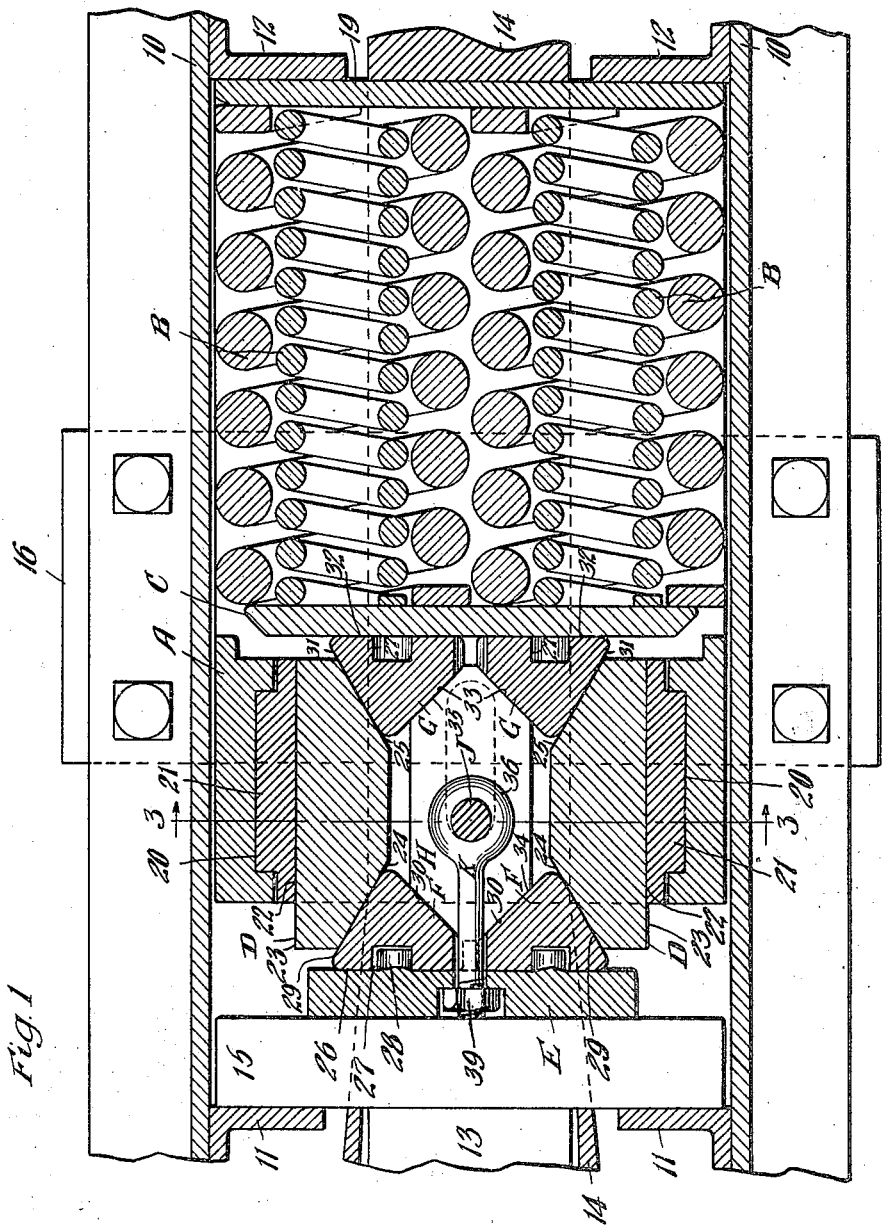

Aug. 14, 1928.　　　　　　　　　　　　　　　　　　　　1,680,282
A. M. BRENNE
FRICTION SHOCK ABSORBING MECHANISM
Original Filed Dec. 22, 1922　　2 Sheets-Sheet 1

Witnesses
Wm. Geiger

Inventor
Arild M. Brenne
By George I. Haight
His Atty.

Aug. 14, 1928. 1,680,282
A. M. BRENNE
FRICTION SHOCK ABSORBING MECHANISM
Original Filed Dec. 22, 1922 2 Sheets-Sheet 2
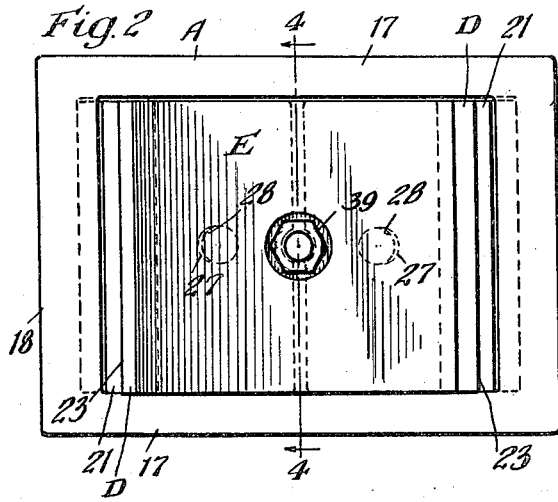
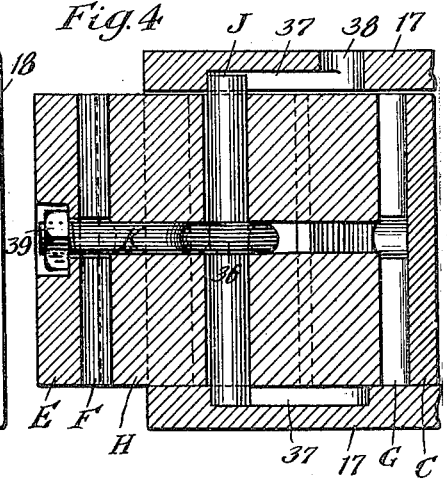
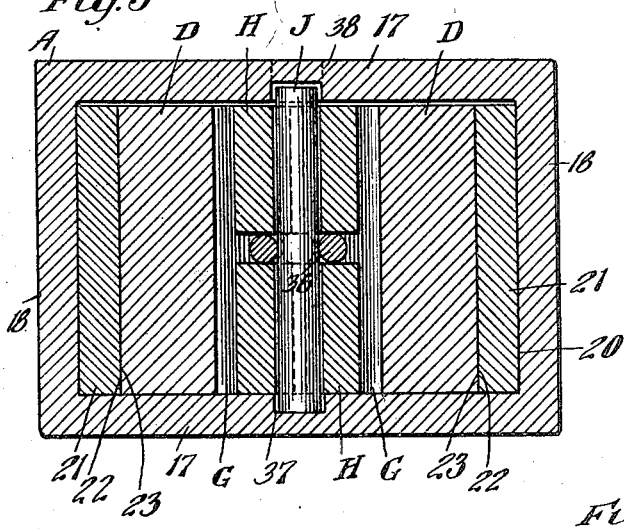
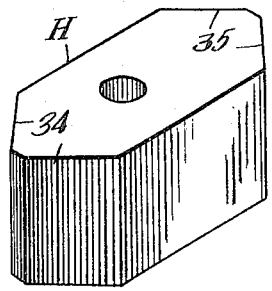
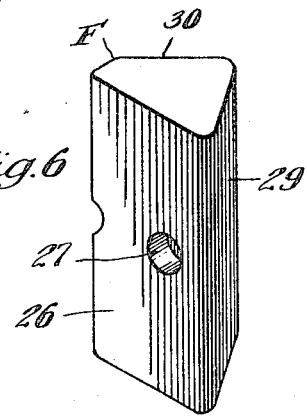
Witnesses
Wm. Geiger
Inventor
Arild M. Brenne
By George I. Haight
his Atty.

Patented Aug. 14, 1928.

1,680,282

UNITED STATES PATENT OFFICE.

ARILD M. BRENNE, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed December 22, 1922, Serial No. 608,403. Renewed February 2, 1927.

This invention relates to improvements in friction shock absorbing mechanisms.

One object of the invention is to provide a friction shock absorbing mechanism of simple and economical construction, having high frictional capacity and with the parts so arranged as to insure certain release.

A more specific object of the invention is to provide, in a friction shock absorbing mechanism, an arrangement of friction elements such that keen angle high capacity producing wedge faces are employed in setting up the friction, and other blunt angle releasing wedge faces are employed to insure the collapse of the parts. Another specific object of the invention is to provide novel means for retaining all of the parts in assembled relation.

In the drawings forming a part of this specification, Figure 1 is a horizontal longitudinal sectional view of a portion of a railway draft rigging showing my improvements in connection therewith. Figure 2 is a front end elevation of the shock absorbing mechanism proper. Figure 3 is a vertical transverse sectional view of the shock absorbing mechanism proper, taken on the line 3—3 of Figure 1. Figure 4 is a broken longitudinal vertical sectional view, corresponding substantially to the section line 4—4 of Figure 2. And Figures 5 and 6 are detail perspectives of one of the center and one of the end wedge elements, respectively.

In said drawings, 10—10 denote channel draft sills of a car underframe to the inner faces of which are secured front stop lugs 11 and rear stop lugs 12. A portion of a draw bar is indicated at 13, the same being operatively associated with the shock absorbing mechanism proper by a hooded cast yoke 14, within which is disposed said shock absorbing mechanism and a front follower 15. The yoke and parts therewithin are supported in operative position by a detachable saddle plate 16.

The improved shock absorbing mechanism proper, as shown, comprises, broadly, a combined friction shell and spring cage casting A; twin arranged main springs B—B; a spring follower C; a pair of friction shoes D—D; a supplemental front follower E; an outer pair of wedge blocks F—F; an inner pair of wedge blocks G—G; a pair of centrally disposed elongated wedge members H—H; a retainer pin J; and a retainer bolt K.

The casting A, as shown, is of rectangular cross-section having top and bottom horizontal walls 17—17; side walls 18—18 and vertical rear integral wall 19, the latter co-operating with the lugs 12 in the manner of the usual rear follower. The side walls 18 are made comparatively short so as to leave the major portions of the sides of the casting A open to permit of the insertion and removal of the springs and certain other parts. The friction shell proper is at the front or forward end of the casting A and preferably the side walls 18 will be recessed as indicated at 20 to receive therewithin suitably shouldered liners 21, each provided with a longitudinally extending inner flat friction surface 22, the latter extending parallel with the axis of the mechanism.

The two friction shoes D are of like construction, each having an outer flat friction surface 23 cooperable with the corresponding shell friction surface 22. At its ends, each shoe D is provided with wedge faces 24 and 25, the wedge faces 24 converging inwardly of the shell and the wedge faces 25 converging outwardly of the shell. All of said wedge faces 24 and 25 are extended at a relatively acute or keen wedging angle with respect to the axis of the mechanism and forces applied parallel or approximately parallel thereto.

The two outer wedge elements F are counterparts, each having a front transverse bearing face 26 engaging the inner side of the supplemental follower E. Each element F is further recessed as indicated at 27 to loosely receive a lug 28 extending from the follower E, said recesses 27 being sufficiently laterally elongated to allow for relative lateral movement between the elements F and the follower E while at the same time preventing the follower E from becoming displaced with respect to the rest of the friction elements. On its outer side, each element F is provided with a wedge face 29 cooperating with a corresponding wedge face 24 of a shoe D. On the side nearest the axis of the mechanism, each element F is provided with another wedge face 30 extending at a comparatively blunt and true releasing angle with respect to the axis of the mechanism, it being observed that said wedge faces 30 diverge inwardly of the shell.

The inner set of wedge elements G, which are also counterparts, are provided with corresponding wedge faces 31 cooperable with the shoe wedge faces 25. Each element G is further provided with a flat transversely extending bearing face 32 engaging the forward side of the spring follower C. On the side adjacent the axis, each element G is provided with another wedge face 33, the latter extending at a blunt angle with respect to the axis of the mechanism and the two said wedge faces 33 diverging outwardly of the shell. The elements G may be recessed as indicated at 27 to make them duplicates of the elements F, so that all elements F and G will be interchangeable.

The wedge faces 30 and 33 of the four wedge elements F and G cooperate with wedge faces 34—34 and 35—35, respectively, provided at the ends of the two parallelly arranged wedge members H, as clearly shown in Figures 1 and 5. The two wedge members H are vertically separated, as best shown in Fig. 3, to accommodate the eye 36 of the retainer bolt K, said eye 36 fitting over the retainer pin J, which passes through vertically alined openings in the wedge members H, the ends of said pin J working in longitudinally extending recesses 37 provided on the interior faces of the top and bottom walls of the casting A, as best shown in Figure 4. With this arrangement, it will be noted that the pin J is limited in its outward movement with respect to the casting A and hence the retainer bolt K will be similarly limited. The pin J may be introduced through an opening 38 in the top wall of the casting A, as shown in Figure 4.

The shank of the retainer bolt K is extended between the two wedge elements F and through an opening in the supplemental follower E, said bolt having a nut 39 secured thereto and located within a suitable recess provided in the follower E, as shown in Figures 1 and 4. With this arrangement, not only are all of the parts held in assembled relation with respect to the casting A, but any desired initial compression may be placed upon the main springs B.

Said main springs B bear at their rear ends upon the rear wall 19 of the casting A and at their forward ends upon the spring follower C, the latter being interposed between springs B and the two wedge elements G.

The operation of the mechanism is as follows, assuming an inward or buffing movement of the draw bar. As the draw bar moves inwardly, the front follower 15 and supplemental follower E will be moved in unison therewith. This induces a corresponding movement of the wedge elements F effecting a wedging action between the same and the shoes D and central wedge H. The wedge elements F have a true wedging action on the shoes D on the cooperating sets of relatively keen angle wedge faces 24 and 29, thereby effecting a heavy spreading or wedging action. A similar spreading action is obtained upon the inner ends of the central wedge H and shoes D, due to the resistance afforded by the spring B re-acting through the wedge elements G. In this manner, not only is a heavy spreading or wedging action obtained, but the same is distributed to the front and rear ends of the shoes D so as to obtain balanced pressure between the shoes and the friction shell. Upon removal of the actuating pressure, the elements F will readily release upon the wedge members H, due to the engaging blunt releasing angle wedge faces 30 and 34, it being observed that the pressure from the friction shell, which has been slightly expanded during a compression stroke will act through the shoes upon the wedge elements F, in a direction transverse to the axis of the mechanism and thus tend to shift the elements F laterally toward each other. Furthermore, the included angle between each set of wedge faces 34 and 24 is sufficiently obtuse to freely permit the wedge elements F to disengage therefrom. Upon collapse of the friction elements at the front or outer end thereof as described, it is evident that the wedge members H will readily free themselves from the inner set of wedge elements G—G, due to the blunt angle of the co-operating sets of faces 33 and 35, this, in turn, permitting relative lateral approach of the wedge elements G sufficient to insure the collapse of the entire friction unit, after which all the parts may be readily projected outwardly as the springs B expand.

As wear occurs on the co-operating friction faces of the shell and shoes, there is a tendency for the friction shoes D to move laterally apart and also to move slightly toward the draw bar. This wear is automatically compensated for by the wedge elements G working forwardly and laterally to correspond, it being observed that the spring follower C is normally spaced from any shoulders of the casting A.

All of the friction elements of the arrangement herein disclosed are of such character that they may obviously be manufactured at comparatively small expense and all the working faces of said elements are flat, thus adapting them to be finished or dressed quickly and at minimum cost. By making the keen angles sufficiently acute, I can obtain any desired frictional capacity within limits of bursting stress of the casting A, and at the same time positively insure an easy and prompt release of the parts.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a friction shell having opposed interior friction surfaces; of a spring resistance; friction shoes cooperable with said shell surfaces, said shoes having oppositely arranged wedge faces at the ends thereof extending at a relatively keen angle with respect to the axis of the mechanism; front and rear sets of wedge elements cooperable with said wedge faces of the shoes; and centrally disposed means interposed between and cooperable with said front and rear sets of wedge elements, said means and wedge elements having engaging wedge faces extending at a relatively blunt releasing angle with respect to the axis of the mechanism.

2. In a friction shock absorbing mechanism, the combination with a friction shell having opposed interior longitudinally extending friction surfaces; of friction shoes co-operable with said surfaces and provided with oppositely extending wedge faces at the ends thereof arranged at a relatively keen wedging angle with respect to the axis of the mechanism a front set of pressure transmitting wedge elements cooperable with the wedge faces at the front ends of said shoes; an inner set of wedge elements co-operable with the wedge faces at the inner ends of the shoes; a wedge member interposed between said wedge elements, the said member and wedge elements having oppositely extending cooperating wedge faces arranged at a relatively blunt and releasing angle with respect to the axis of the mechanism; a spring resistance; and a spring follower interposed between said resistance and the inner set of wedge elements.

3. In a friction shock absorbing mechanism, the combination with a friction shell having opposed interior friction surfaces; of a spring resistance; friction shoes cooperable with said shell surfaces, said shoes having oppositely arranged wedge faces at the ends thereof; front and rear sets of wedge elements cooperable with said wedge faces of the shoes; centrally disposed means interposed between and cooperable with said front and rear sets of wedge elements; a follower engaging the front ends of said front set of wedge elements; and means interposed between the shell and said follower limiting the outward movement of the latter with respect to the shell.

4. In a friction shock absorbing mechanism, the combination with a friction shell having opposed interior friction surfaces; of a spring resistance; friction shoes cooperable with said shell surfaces, said shoes having oppositely arranged wedge faces at the ends thereof; front and rear sets of wedge elements cooperable with said wedge faces of the shoes; centrally disposed means interposed between and cooperable with said front and rear sets of wedge elements; a follower engaging the front ends of said front set of wedge elements; and means interposed between the shell and said follower limiting the outward movement of the latter with respect to the shell, said means comprising, a pin slidable with respect to the shell and limited in its outward movement relatively thereto, and a retainer bolt anchored to said pin at one of its ends and to said follower at the other of its ends.

5. In a friction shock absorbing mechanism, the combination with a friction shell having a pair of opposed interior friction surfaces; of a spring resistance; follower acting means, said follower acting means and shell being relatively movable toward and from each other; friction shoes co-operable with said shell friction surfaces, said shoes being disposed at opposite sides of the mechanism and each shoe having a pair of wedge faces on the inner side thereof, said faces being disposed at the opposite ends of the shoe, and the faces at corresponding ends of the shoes being in opposed diverging relation, the opposed faces at the front ends of the shoes diverging outwardly and the faces at the rear ends of the shoes diverging inwardly of the mechanism; front and rear pairs of wedge blocks, the members of each pair being disposed on opposite sides of the longitudinal axis of the mechanism and each wedge block of each pair having an outer wedge face correspondingly inclined to and adapted to co-operate with the wedge face at the corresponding end of the shoe at the same side of the mechanism, each block also having an inner wedge face, the inner wedge faces of each pair of wedge blocks being arranged opposite said last named faces of the front and rear blocks and diverging respectively inwardly and outwardly of the mechanism, said front pair of wedge blocks being movable in unison with said follower acting means; and a centrally disposed wedge member having converging pairs of wedge faces at the opposite ends thereof, each pair co-operating with the inner wedge faces of the pair of shoes at the corresponding end of said wedge member.

6. In a friction shock absorbing mechanism, the combination with a friction shell; of wedge means movable relatively toward and away from the shell; means for anchoring the wedge means to the shell and limiting outward movement of the former with respect to the latter, said anchoring means including a retaining bolt having a head at one end engaging the wedge means to limit outward movement thereof and a pin-receiving opening at the other end thereof, and a transversely extending pin extending through said opening and fitting the same, said pin being held against endwise displacement by abutment guide faces on two opposed wall sections of the shell; interior limiting shoulders on said opposed wall sections co-operating with the ends of the pin to limit outward movement of the latter and the wedge means; friction shoes having wedging engagement with the wedge means and frictional engagement with the shell, said shoes having their outward movement limited by the wedge means; and a spring resistance within the shell opposing inward movement of the shoes.

7. In a friction shock absorbing mechanism, the combination with a rectangular spring cage having a rectangular friction shell section at one end thereof, said shell section having friction surfaces on two opposite walls thereof, the remaining opposed walls being provided with interior aligned grooves, one of said last named walls being provided with an opening communicating with the inner end of the groove of said wall; of wedge means; a headed retainer member secured to said wedge means, said retainer member being provided with a pin receiving eye, a pin extending through the eye and having its opposite ends working in said aligned groove, outward movement of the pin being limited by the shoulders at the front ends of said aligned groove, said pin being insertible through the pin receiving opening of said cage; friction shoes having wedging engagement with the wedge means and frictional engagement with the friction shell section of the cage; and means within the cage yieldingly opposing inward movement of the friction shoes.

In witness that I claim the foregoing I have hereunto subscribed my name this 29th day of November 1922.

ARILD M. BRENNE.